No. 707,414. Patented Aug. 19, 1902.
J. J. HEYS.
LEVELING MACHINE.
(Application filed Apr. 25, 1901.)
(No Model.) 7 Sheets—Sheet 4.
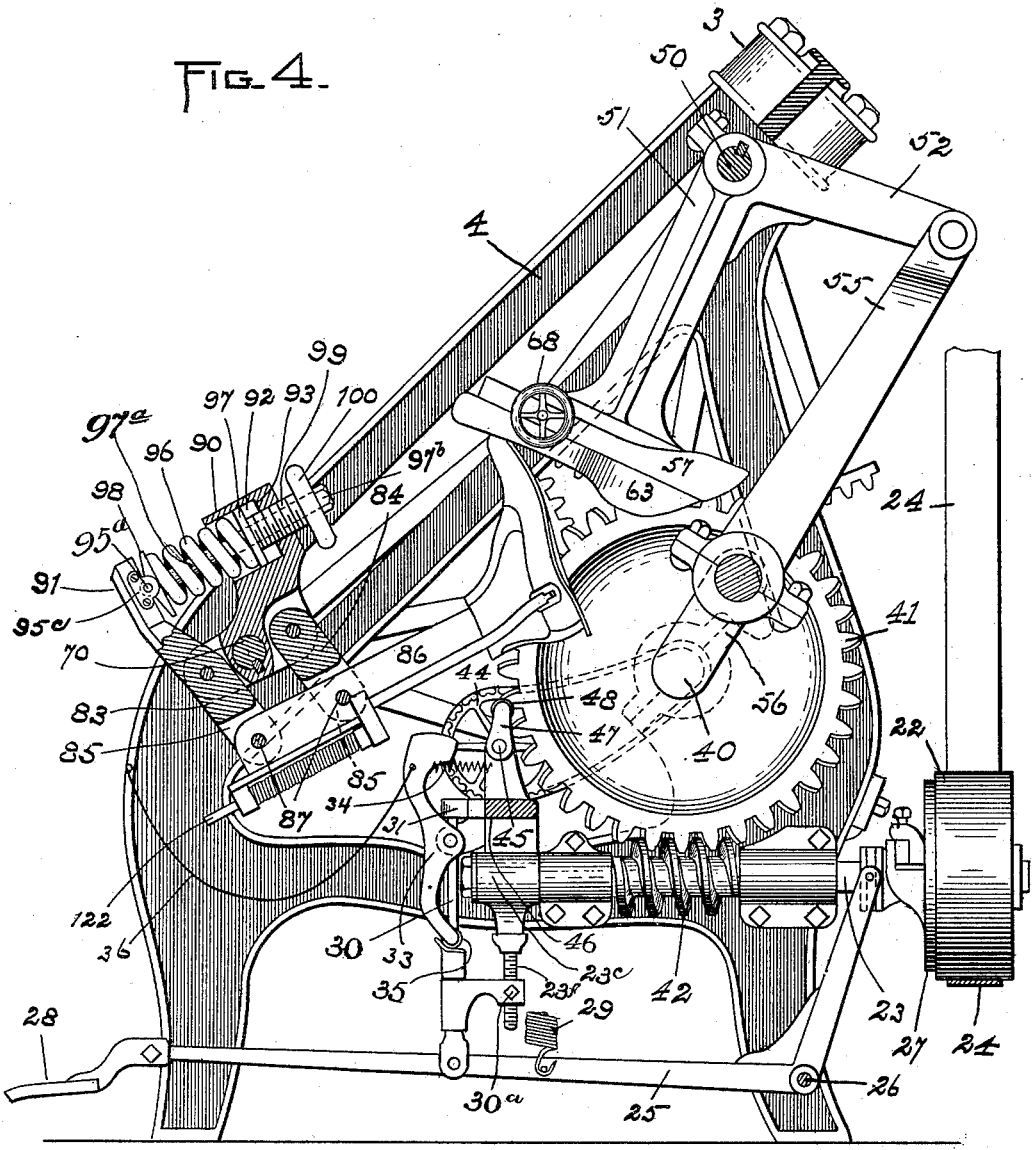

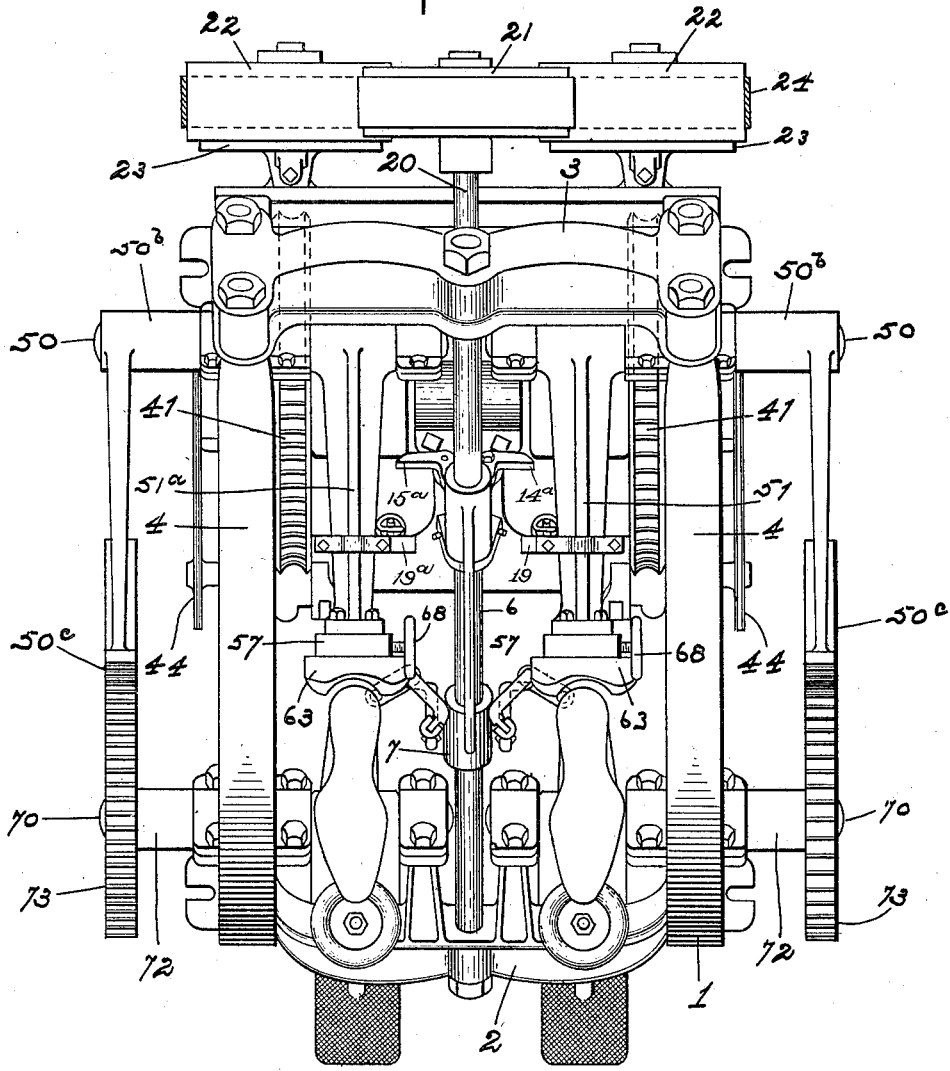

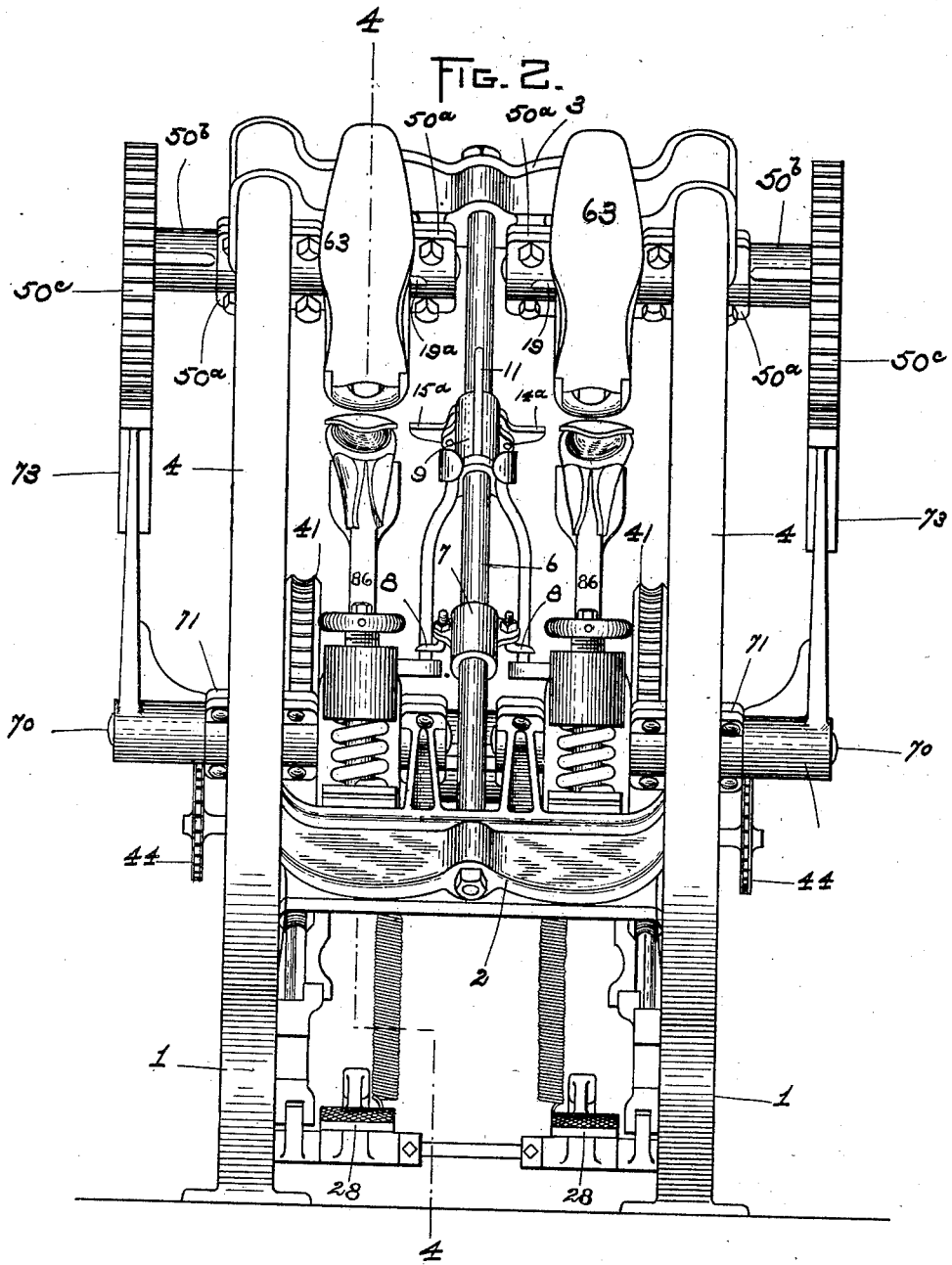

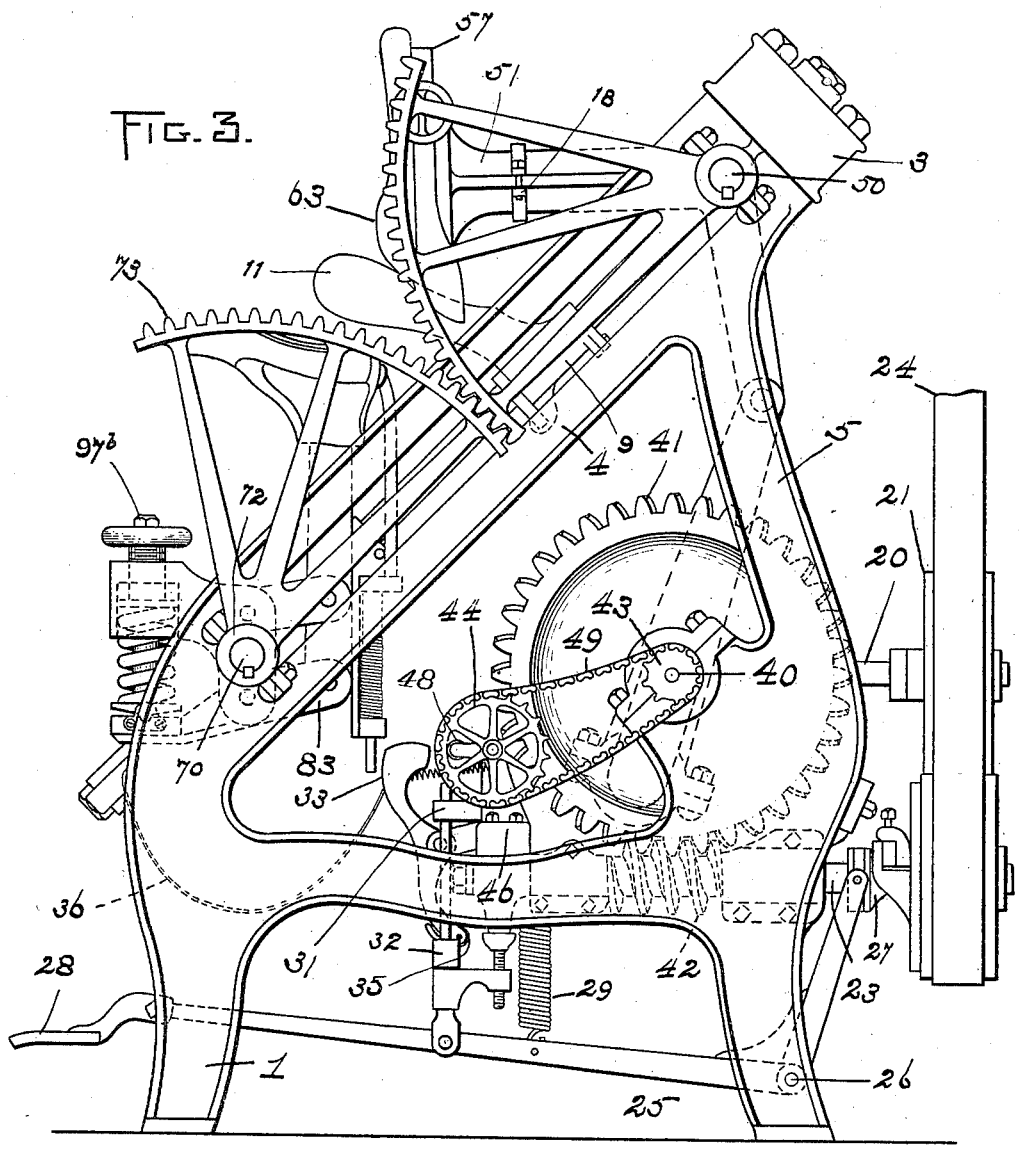

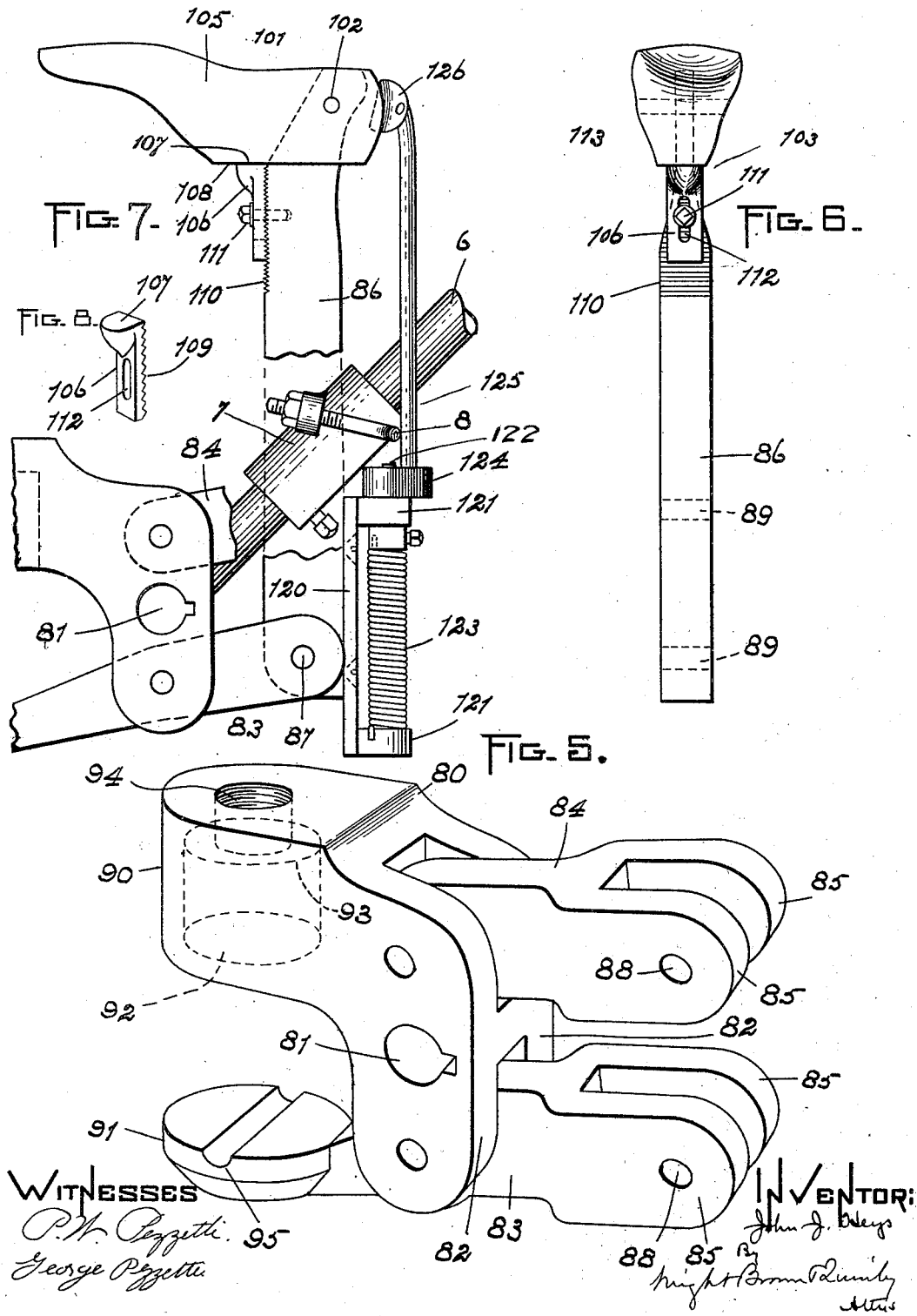

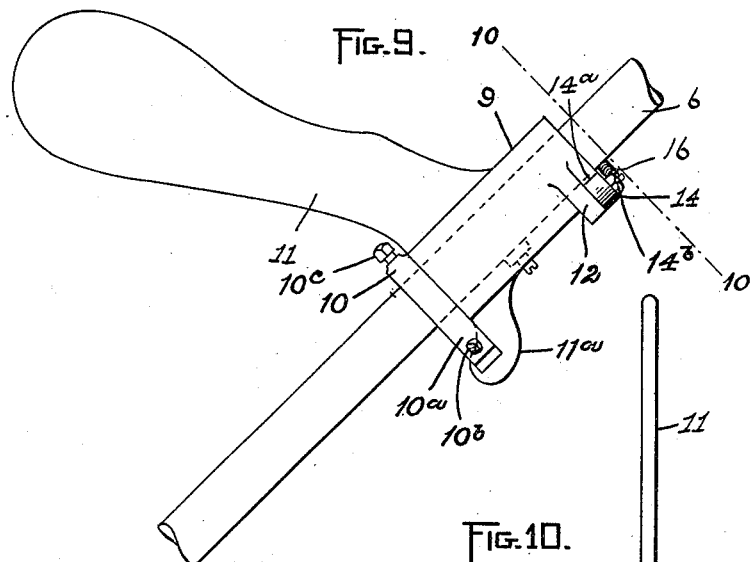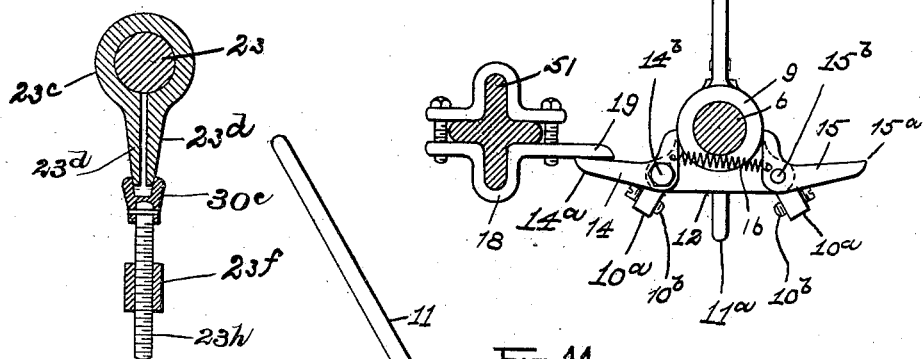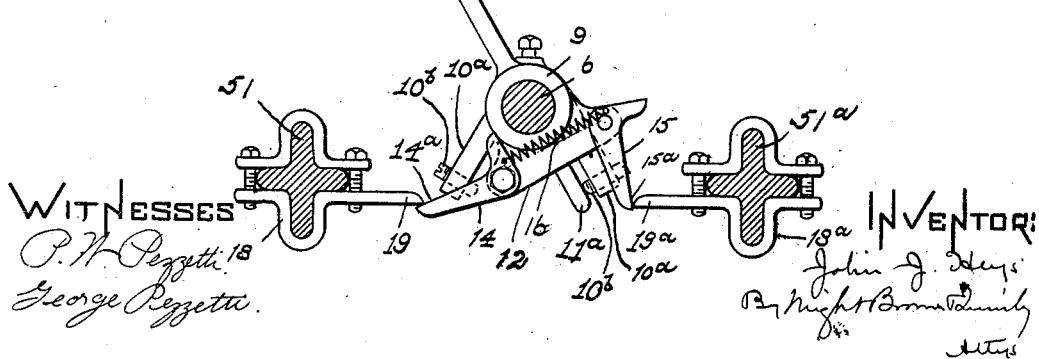

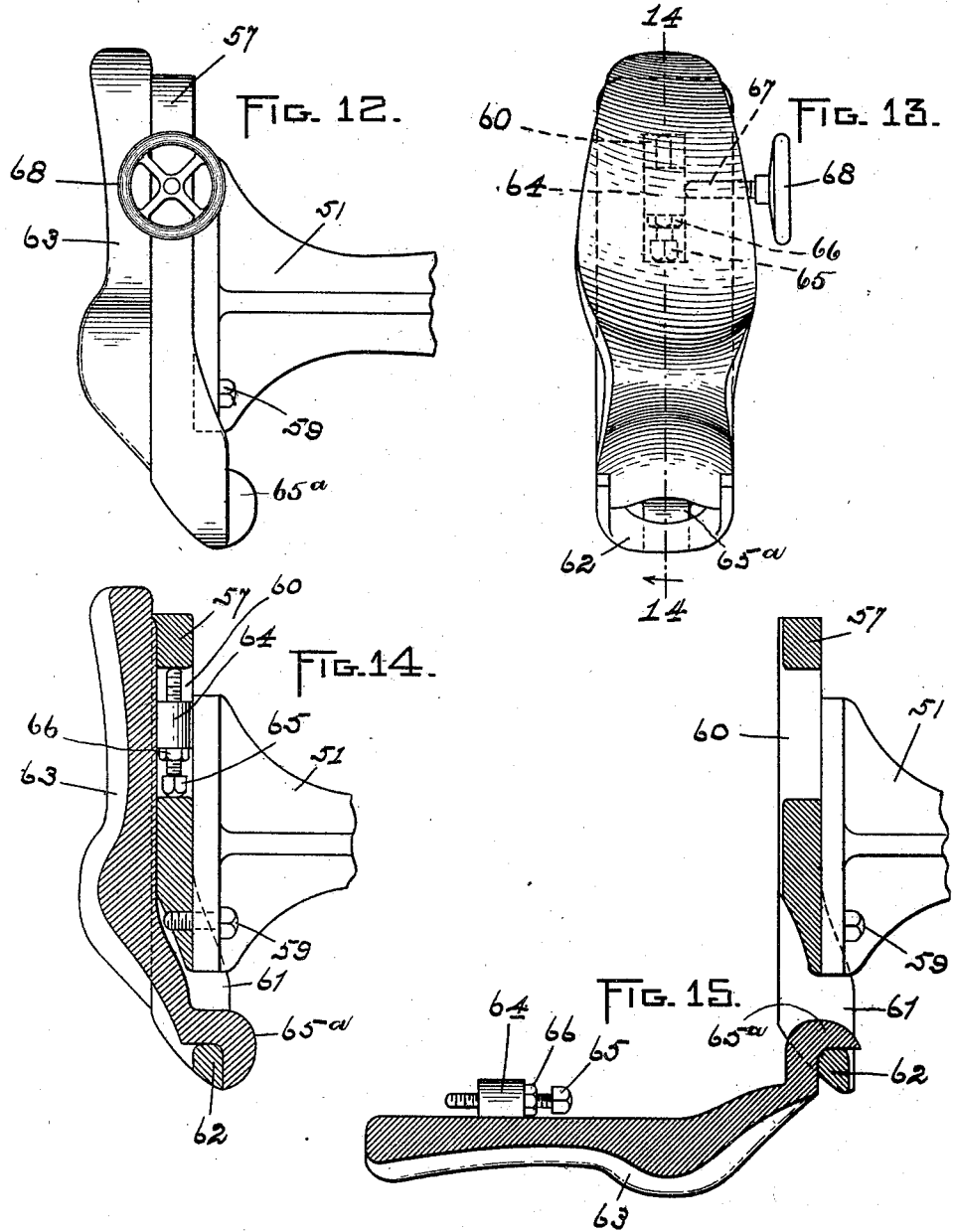

UNITED STATES PATENT OFFICE.

JOHN J. HEYS, OF LYNN, MASSACHUSETTS, ASSIGNOR OF ONE-HALF TO MAURICE V. BRESNAHAN, OF LYNN, MASSACHUSETTS.

LEVELING-MACHINE.

SPECIFICATION forming part of Letters Patent No. 707,414, dated August 19, 1902.

Application filed April 25, 1901. Serial No. 57,421. (No model.)

*To all whom it may concern:*

Be it known that I, JOHN J. HEYS, of Lynn, in the county of Essex and State of Massachusetts, have invented certain new and useful Improvements in Leveling-Machines, of which the following is a specification.

This invention relates to a new and useful improvement in leveling-machines; and it consists in the novel features of construction and relative arrangement of parts hereinafter fully described in the specification, clearly illustrated in the drawings, and particularly pointed out in the claims.

Reference is to be had to the accompanying drawings, forming a part of this specification, wherein like characters are used to indicate like parts wherever they occur.

Of the drawings, Figure 1, in top plan view, shows a leveling-machine constructed according to my invention. Fig. 2 is a front end elevation of the same. Fig. 3 represents a side elevation. Fig. 4 represents a vertical sectional view on line 4 4 of Fig. 2, showing the mechanism of one side of the machine whereby movement is given to the last and to the form and also the means whereby the surface of the boot or shoe sole is made automatically to travel in the same arc irrespective of the thickness of the sole, or, in other words, the mechanism whereby the work may yield to automatically adjust itself, so that not only the arc in which the form moves, but also the arc in which the surface of the work moves, shall each be constant. Fig. 5 represents a detailed perspective view of the mechanism whereby the last automatically maintains the surface of the boot or shoe in the same arc irrespective of the thickness of the sole. Fig. 6 is a front elevation of the last and its supporting-standard. Fig. 7 represents a side elevation of the same, showing the connection between the standard and the last and also the means for supporting the latter. Fig. 8 represents a detailed perspective view of the adjustable support carried by the standard. Fig. 9 represents a detailed view of the guard. Fig. 10 represents a cross-sectional view on the line 10 10 of Fig. 9. Fig. 11 is a like view showing the guard tilted and the yielding connections between the guard and the lugs on the arms that support the forms. Fig. 12 represents in side elevation the mold and its supporting bed and arm. Fig. 13 is a bottom plan view of the same. Fig. 14 is a vertical sectional view on the line 14 14 of Fig. 13. Fig. 15 is a view similar to Fig. 14, showing the forms partially detached from its bed. Fig. 16 is a detailed vertical sectional view of the brake mechanism.

Of the drawings, 1 1 represent upright sides of the framework, that are joined at the front by a cross-piece 2 and at the rear by a cross-piece 3. Cross-piece 3 is at the rear and top of the framework, while the cross-piece 2 is at the front and lower portion of the framework, so that the sides 4, that join the cross-pieces 2 and 3, are at an angle to the base of the machine.

Side piece 1 extends up to form struts 5 to support the upper end of the inclined frame 4, that supports the shafts 50 and 70, that carry, respectively, the mold and jack supports. (See Figs. 2, 3, and 4.)

6 represents a rod joining the ends 2 3.

9 represents a sleeve (see Fig. 9) rotatably mounted on the rod 6 and held in place on the rod 6 by a collar 10, having a set-screw 10$^c$. Sleeve 9 upon its front side is formed with a guard 11, here shown as a blade or arm, designed to prevent the workmen from getting caught between the last and mold of the moving half of the machine hereinafter described.

The sleeve 9 opposite the guard 11 is formed with a lug 11$^a$, arranged between two lugs 10$^a$ upon the collar 10. A set-screw 10$^b$ in each lug 10$^a$ serves as an adjustable stop against which the lug 11$^a$ can strike to limit the movement of the guard and prevent it from being moved far enough to be caught between a mold and last. The collar 9 is formed with a web 12. A bell-crank 14 is secured to this web upon the right-hand side of the rod 6 by a bolt 14$^b$. A like bell-crank 15 is secured to the web 12 upon the opposite side of the rod 6 by a bolt 15$^b$. One arm of each bell-crank rests against the collar 9, while the other arms are formed as fingers 14$^a$ and 15$^a$, respectively. One of the bell-cranks (here shown as the bell-crank 14) I secure rigidly in position by its bolt 14$^b$, while the other bell-crank 15 is arranged to turn freely on its bolt or pivot 15ᵇ. A spring 16 is connected at one end to the short arm of the bell-crank 14 and at its other end to the short arm of the bell-crank 15, whereby that arm is yieldingly held against the collar 9. If desired, the bell-crank 14 may be movably mounted and the bell-crank 15 rigidly mounted. 51 51ᵃ, Fig. 1, represent the arms that support the molds and their beds. Clamps 18 18ᵃ, Figs. 10 and 11, are secured to these arms. Clamp 18 is formed with a finger 19, and clamp 18ᵃ is formed with a finger 19ᵃ. When the finger 19 engages the finger 14ᵃ, the sleeve 9 will be moved on the rod 6 and the guard 11 moved to the left in Fig. 10 or to the position shown in Fig. 11. When the end 15ᵃ of the bell-crank 15 is engaged with the finger 19ᵃ, the sleeve 9 and guard 11 will be thrown to the right in Fig. 10 or to the position the reverse of what is shown in Fig. 11. Should it happen in operating both sides of the machine in unison that the finger 19 engaged the finger 14 at the same time that the finger 19ᵃ engaged the finger 15ᵃ, the spring 16 permits the bell-crank 15 to be turned on its pivot, and thus the finger 15ᵃ lets the finger 19ᵃ pass, the sleeve 9 and its guard 11 being in that case controlled and turned by the finger 19 to the position shown in Fig. 11. The spring 16 is of sufficient strength to permit turning the guard 11 when the finger 14 is not engaged by the finger 19. When, however, the fingers of the bell-cranks are engaged simultaneously, the spring permits the yielding of the bell-crank 15 to allow the latter to turn before the parts are broken or otherwise injured. The described arrangement of parts is such that the guard 11 is automatically caused to stand in front of the mold and last that are going into pressure to prevent the operator from being caught or his hands or arms from slipping between the said molds and lasts as they go into pressure. Ordinarily the arm 51 will come to the front and its mold out of pressure as the arm 51ᵃ and its mold go into pressure, and vice versa. As either arm starts forward its finger 19 or 19ᵃ turns the guard 11 to stand in front of the mold and complemental last that is going into pressure.

20 represents a shaft supported at the rear of the machine and carrying an idler or belt-tightening pulley 21.

22 22 represent clutch-pulleys carried by shafts 23, one on each side of the machine, the clutch-pulleys being driven by the belt 24.

25 represents a bell-crank or treadle pivoted at its angle to the rear part of the framework, as at 26. The shorter arm of the treadle engages the sleeve of the clutch 27 on the shaft 23. The longer arm of the bell-crank carries a footpiece 28. A spring 29 connects the long arm of the bell-crank with the framework, the spring tending to draw the footpiece 28 upward and to keep the clutch disengaged from the pulley, the engagement of the clutch and pulley being effected by depressing the footpiece 28 against the tension of the spring 29.

30 represents a rod pivoted at its lower end upon the arm 25 and slidingly supported at its upper end in a lug 31, carried by the framework.

32 represents a lug mounted upon the rod 30.

33 represents a catch pivoted midway its length to the framework. A spring 34, connected at one end to the upper part of the catch and at its other end to the framework, tends to draw or throw the lower end of the catch to the left in Figs. 3 and 4. The lower end of the catch is provided with a roller 35. The catch is arranged in the vertical plane of the lug 32, so that as the lug 32 is forced down by depressing the footpiece 28 the roller 35 is pulled onto a seat on the top of the lug 32, thus holding the treadle down until the catch is tripped.

A chain or cord 36 (see Figs. 3 and 4) is connected at one end to the upper end of the catch 33 and furnishes a convenient means by which the catch may be tripped at any time and the treadle permitted to rise and throw out the clutch.

40 (see Fig. 4) represents two shafts arranged in line and running crosswise of the machine near the lower rear end thereof. Upon each shaft 40 is mounted a worm-gear 41, meshing with a screw 42, formed on each shaft 23. (See Figs. 3 and 4.)

On one end of the shaft 40 (see Fig. 3) is mounted a pinion 43, here shown as a sprocket-wheel. A companion sprocket-wheel 44 is mounted upon a shaft 45, carried by a casting 46, secured to the framework. Upon this shaft 45 is rigidly mounted an arm 47, provided with a roller 48, arranged in the same vertical plane as the upper arm of the catch 33. (See Figs. 3 and 4.)

A sprocket-chain 49 connects the sprocket-wheel 43 with the sprocket-wheel 44, by which the latter and the shaft 45 are turned. By the arrangement of the sprocket-gears 43 44 the relative speed at which the shaft 45 is turned may be varied as desired, the purpose being to have the roller 48 engage the upper end of the catch 33 at a predetermined time in the operation of the machine in order to trip the catch 33 and stop the machine at a predetermined point. In the form shown the engagement is such that the catch 33 will be tripped by the roller 44 after that particular half of the machine has made two complete operations; but the mechanism could be arranged to trip the catch after one or any desired number of operations. Each shaft 23 (see Figs. 3, 4, and 16) is supplied with an automatic brake of any preferred construction, as 23ᶜ, to stop the machine when the treadle is released from the catch 33. This brake comprises a split ring surrounding the shaft and formed with depending fingers 23ᵈ, that normally stand apart with the ring loose on the shaft.

23ᶠ represents a lug carried by the rod 30. In a screw-threaded aperture in this lug is mounted a screw-threaded spindle 23ʰ, arranged to be held in any position of adjustment by a set-screw 30ᵃ. The ends of the fingers 23ᵈ are arranged inside the inclined walls of a cup-cam 30ᵉ in such manner that when the treadle rises the cup-cam will cause the fingers 23ᵈ to close the split ring to grip the shaft, and vice versa.

50 represents two shafts mounted in the upper rear end of the framework. To each of these shafts 50 is rigidly secured a bell-crank, having an arm 51 and an arm 52. (See Fig. 4.)

55 represents a pitman connecting the free end of the arm 52 with a crank 56 on the shaft 40, whereby a rocking movement is given to each shaft 50 and the parts carried thereby, it being understood that the machine comprises two independent but substantially identical sets of mechanism. (See, for instance, Fig. 2.)

57 represents a bed secured by bolts 59 to the free end of each arm 51 51ᵃ. (See Figs. 1, 3, 4, 12, 14, and 15.) The bed 57 is formed with a slot 60 at one end and with a slot 61 at its opposite end, the outer wall of the slot 61 being formed as a hinge bar or support 62. (See Figs. 14 and 15.)

63 represents the mold. A lug 64 is formed on the under side of the mold and fits snugly the side walls of the slot 60. (See Fig. 13.) In this lug and longitudinally of the axis of the mold is arranged a set-screw or an adjusting-screw 65 of a length to have its ends fit snugly the end walls of the slot 61. (See Figs. 13 and 14.) Upon the screw 65 is a lock-nut 66 for retaining the screw at any desired position. By the described arrangement of parts the mold can be adjusted longitudinally of its axis and yet be firmly maintained in its adjusted position. The mold at the end opposite the lug 64 is provided with a finger 65ᵃ to be inserted in the recess 61 and lock about the bar 62. By adjusting the screw 65 back and forth the mold, as shown in Fig. 14, may be adjusted to any desired position on the bed 57, the head of the screw seating against one of the end walls forming the recess 60 and the end of the screws seating against the opposite wall.

67 represents a set-screw provided with a hand-wheel 68. This set-screw is passed through the bed 57 and arranged to impinge upon casting 64 when the latter is in position in the recess 60 (see Fig. 13) in order to hold the mold in place upon the bed. To remove the mold from the bed, it is only necessary to turn the hand-wheel 66, when the mold may be dropped down to the position shown in Fig. 15 and then removed from the bed. By this means and by means of the adjusting-screw 65 different molds may be readily applied to and adjusted upon the bed 57 and removed therefrom.

70 represents two shafts arranged in line and mounted in the lower front side of the framework. These shafts are supported, respectively, by suitable bearings 71 71, corresponding to the bearings 50ᵃ in which the shafts 50 are mounted. A sleeve 72 is secured to each of the outer ends of the shaft 70. Each sleeve carries a segmental gear 73.

50ᵇ represents sleeves secured, respectively, to the outer ends of the shafts 50. (See Figs. 2 and 3.) Each of these sleeves carries segmental gears 50ᶜ, arranged to mesh with the gears 73, whereby the rocking motion imparted to the shaft 50 is in turn imparted to the shaft 70, and both shafts and the parts carried thereby are compelled to move in unison.

80 (see Fig. 5) represents a casting formed with a keyed aperture 81, whereby the casting may be slid upon and keyed to shaft 70. As one of these castings 80 and its associative parts are secured to each shaft 70 a description of one will suffice for both. The casting below the aperture 81 is formed with two ears 82, in which is pivoted a lever 83. A like lever 84 is pivoted to the casting above the aperture 81, so that there is a lever 83 84 on each side of the shaft 70 when the parts are in position.

The free ends of the levers 83 84 are formed with forks or arms 85. In these forks is arranged the standard 86, the forks of each lever being pivoted to the standard by pins 87, passing through holes 88 in the forks and 89 in the standard.

The casting 80 is formed with a rear projection 90, which overhangs a circular base 91, formed as an extension of the lever 83. (See Fig. 5.) The extension 91 is formed with a circular recess 95. The projection 90 is cored out, as at 92, to form a spring-chamber having a shoulder 93. A screw-threaded aperture 94 communicates with the top of the chamber 92.

A spring 96 is arranged in the chamber 92 and rests against a sliding plate 97 in the chamber. The opposite end of the spring bears against a like or similar plate 98, formed with a circular boss 95ᵃ, arranged in the recess 95 and held by ears 95ᶜ on the extension 91. An adjusting-screw 99, provided with a hand-wheel 100, is inserted in the aperture 94, bears upon the plate 97, and serves as a means by which the last and its standard may be adjusted up or down, as desired. A rod 97ᵃ is connected at one end to the plate 98, passes up through the spring 96 and screw 93, and is maintained in place by a nut 97ᵇ, that may be adjusted to overcome lost motion between the spring and other parts. The rod 97ᵃ and associated parts maintains the parts together between the extension 91 and projection 90.

The arrangement and mounting of the levers 83 84 insure the moving of the standard 86 in a constant plane with relation to the axis of the shaft 70 and also the movement of the standard in parallel lines as the last advances toward or recedes from the mold irrespective of the point of contact between the mold and last. By means of the hand-wheel 100 the free end of the standard and the last may be adjusted toward or from the axis of the shaft 70 and the power to be exerted upon the boot or shoe sole regulated at will.

The upper end of the standard 86 is beveled on its front side, as at 101, and provided with a pintle-eye 102. (See Fig. 7.) The upper end of this standard is also reduced in thickness to form a tongue 103, adapted to enter complemental recesses in the last 105.

106 represents an adjustable support. This is formed with a flat shoulder 107, adapted to engage a complemental shoulder or face 108 on the last. The support 106 is formed with serrations 109, adapted to engage complemental serrations 110 on the standard, the support being secured to the standard by a bolt 111, passing through a slot 112 in the support. The serrations 109 and 110 serve also to prevent the support being forced down by pressure upon the last. By means of this support and its adjustability I am enabled to provide for the wear on the face 108 of the last and the face that bears against the side 101 of the end of the standard 86, and thus moving the support up keep the working surface of the last always in the same plane, so that the bottom of the last can always be maintained in a predetermined position irrespective of wear by adjusting the support 106 up or down. The lasts, irrespective of size, I make with the face 108 and the pintle-hole 102 at a uniform distance apart, so that when applied to the standard 86 they have a definite relation to the support 106 and may be readily maintained with their soles in the same plane irrespective of wear. The support 106 further relieves the face 101 of a large part of the pressure it has heretofore been called upon to withstand.

120 represents a plate carried by the standard 86. This plate is formed with ears 121, in which is mounted a shaft 122. A spring 123 on said shaft yieldingly holds the same in a predetermined direction. The free end of the shaft is formed with a crank 124, which carries a vertical standard 125, provided upon its free end with a shoe 126, whose purpose is to engage the heel of the boot or shoe while the latter is under pressure to prevent the shoe from crawling up on the last.

7 represents a collar secured on the rod 6. This casting carries two stop-arms 8, there being one such stop-arm for each standard 125. The position of the stop-arms 8 is such that the standards 125 are engaged thereby when the shoe comes out from pressure, the result being that the standard 125 is forced back and the shoe 126 then drawn from engagement with the heel of the boot or shoe, the shaft 122 turning and the spring 123 being put under tension, so that when the shoe or another shoe on the last comes back under pressure the spring 123 will compel the shoe 126 to yieldingly engage the heel of the boot or shoe on the last as soon as the standard 125 moves far enough inward to be released from the restraining action of the pin 131. By this construction the shoe 126 prevents the heel of the boot or shoe working up on the last under pressure, the shoe 126 releasing the boot or shoe as soon as it comes out of pressure.

Having thus explained the nature of my invention and described a way of constructing and using the same, though without attempting to set forth all the forms in which it may be made or all the modes of its use, what I claim, and desire to secure by Letters Patent, is—

1. In a leveling-machine, a mold arranged to travel in a uniform arc, a complemental yieldingly-mounted last arranged to travel in a complemental arc, and means controlled by the bottom of the sole of the boot or shoe for limiting the movement of the last up or down whereby the sole of the boot or shoe upon the last is caused to move in the same arc, irrespective of the thickness of the sole.

2. In a leveling-machine, a mold arranged to travel in the arc of a circle, a complemental last and its standard, a pivoted support provided with two pivoted arms that are pivotally connected to said standard, and adjustable yielding connections between one of said arms and the support whereby the last may be given a predetermined yielding resistance and adjustment without changing the position of the bottom of the sole of the boot or shoe with relation to the axis of said support while the said sole is under pressure.

3. In a leveling-machine, two independent sets of molds and lasts confined to movement in the arc of a circle, and means connected with the lasts for automatically regulating the amount of pressure applied to the sole of the boot or shoe without changing the arc of movement of the mold or of the surface of said sole when under pressure.

4. In a leveling-machine, a mold-bed adapted for attachment to an arm or support, a mold formed with a locking member at one end, and at its other end carrying an adjusting member, said members being adapted to engage complemental members upon the mold-bed.

5. In a leveling-machine, a mold-bed adapted for attachment to an arm or support, a mold formed with a locking member at one end, and at its other end carrying an adjusting member, said members adapted to engage complemental members upon the mold-bed and means for locking the mold to the bed.

6. A mold for a leveling-machine, formed with a locking member at one end, and at its other end with an adjusting member.

7. In a leveling-machine, a last, a standard having provisions for attaching a last thereto, and an adjustable stop carried by the standard arranged to engage complemental means upon the last, whereby the sole of the last may be maintained in a predetermined plane irrespective of the size or shape of the last or the wear of its crown due to pressure, &c.

8. In a leveling-machine, two sets of pivoted molds and complemental lasts confined to movement in the arc of a circle, and automatic means for causing either of said sets to perform a predetermined number, one or more, of pressing operations and then stop with the last in a position of clearance.

9. In a leveling-machine, a last having provisions for attachment to a standard and a pressure-resisting face upon the crown of said last adapted for engagement with a complemental support upon the jack or standard.

10. In a leveling-machine, a mold, a last, means for moving said parts in complemental arcs, comprising a last-standard, a pivoted support carrying two pivoted arms that are pivotally connected to said standard and yielding means engaging one of said arms whereby the last is yieldingly supported and will recede from or advance toward the mold in parallel lines irrespective of the point of contact between the mold and last.

11. In a leveling-machine, two sets of molds and complemental lasts, means for moving the last and mold of each set in complemental arcs and means whereby the last at the completion of the pressing operation is automatically brought to a vertical position of clearance.

In testimony whereof I have affixed my signature in presence of two witnesses.

JOHN J. HEYS.

Witnesses:
P. W. PEZZETTI,
E. BATCHELDER.